3,431,484
SECOND HARMONIC GENERATOR
Yoh-Han Pao, Chatham, and Peter M. Rentzepis, Bernardsville, N.J., assignors to Bell Telephone Laboratories, Incorporated, New York, N.Y., a corporation of New York
Filed Sept. 22, 1965, Ser. No. 489,402
U.S. Cl. 321—69                          5 Claims
Int. Cl. H02m 5/16

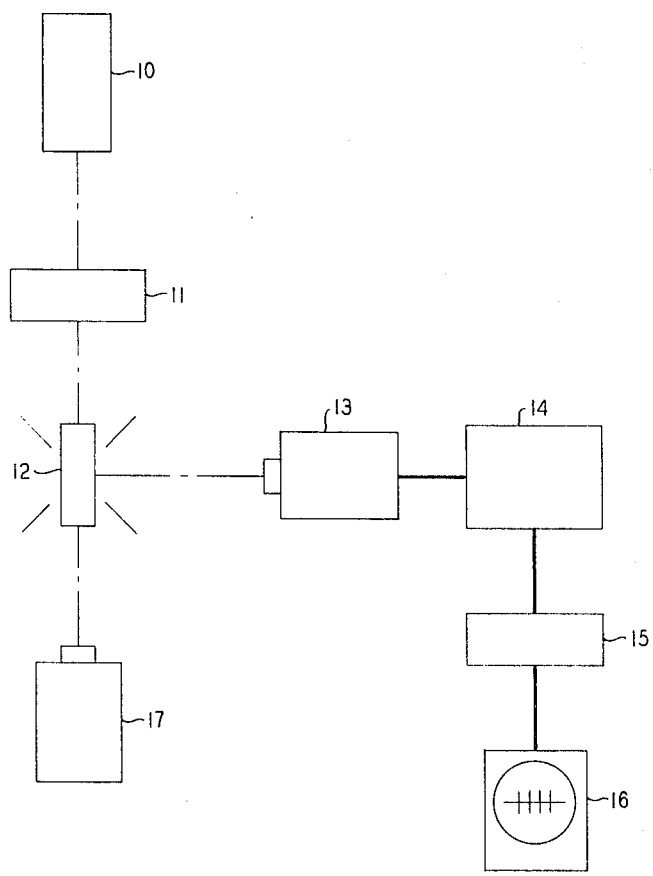

This invention relates to the generation of coherent second harmonic light radiation in organic crystals.

Various substances are known to possess the ability to emit detectable secondary radiation by a two-photon absorption process. The generated photon has a frequency corresponding to a harmonic frequency of the incident radiation. This process is characteristically inefficient. However, with the availability of high power laser sources, a large inefficiency can be tolerated and second harmonic generation has become a useful and significant method for obtaining coherent radiation at frequencies considerably higher than that of the fundamental laser frequency.

The prior art has described second harmonic generation in inorganic crystals. This invention is directed to second harmonic generation in organic crystals, and specifically in organic crystals which have a signficant absorption at the frequency of the second harmonic.

The organic materials to which the invention is directed are molecular crystals which do not possess a center of inversion. The usual method for determining whether or not a crystal meets this condition is by means of X-ray diffraction. Crystals formed from optically active molecules usually possess space group symmetries which do not have a center of inversion. A preferred class of materials in which this property is evident are condensed polynuclear hydrocarbons. However, any organic molecular crystal possessing this critical property will exhibit second harmonic generation.

These and other aspects of the invention will be described more fully below. The drawing is a schematic representation of a second harmonic generator in accordance with the invention.

With reference to the drawing the generation of second harmonic light radiation in an optically active organic material according to this invention was demonstrated by passing the output of a laser 10 through a Corning CS 2–59 filter 11 to cut off the ultraviolet radiation from the Xenon flash lamp and focusing onto the crystalline sample 12. The second harmonic was detected with an EM1–6256B photomultiplier tube 13 mounted on a Jarrell-Ash 75–000 plane grating Spectrograph (F/6.3) 14 and the output was passed through Baird-Atomic RD/UV3470 filter 15 and was fed to a type 535 Textronic oscilloscope 16 with a dual trace-type CA plug-in unit. The laser power was monitored with a 1P–28 photomultiplier tube 17. With this arrangement there was no background in the second harmonic signal which could be attributed to scattered laser radiation. The samples were microcrystalline thin layers of about $20\mu$ on thin microscope glass covers. Second harmonic generation at 3,470A was demonstrated with organic crystals of the condensed polynuclear hydrocarbon 3,4-benzpyrene and 1,2-benzanthracene using a pulsed ruby laser (output 6940A). The efficiency of the second harmonic generation was $5 \times 10^{-6}$. Similar results were obtained using a $\sim.5$ percent $Nd^{+3}$ in Barium Crown glass laser (output 10,610A) and a gas He-Ne laser (output 6,328A). The organic crystals used have absorptions at the second harmonic of the ruby (3,470A) of 80 percent and 90 percent, respectively.

The feature which makes the invention particularly unobvious is the fact that the organic crystal is essentially opaque to the second harmonic frequency. Since this is a basic feature of the invention the organic crystals falling within the scope of the invention are those which have a significant absorption at the second harmonic frequency. As a matter of definition this reference to the term "absorption" is intended to define at least 10 percent absorption at the second harmonic frequency.

Various additional aspects of the invention will become apparent to those skilled in the art. All such variations and deviations which basically rely on the teachings through which this invention has advanced the art are properly considered within the spirit and scope of this invention.

What is claimed is:

1. A second harmonic generator comprising, in combination, a laser source of coherent light radiation at a fixed fundamental frequency, and an organic molecular crystal which does not possess a center of inversion and which exhibits an absorption of at least 10 percent at the frequency of the second harmonic of the laser radiation, means for directing the output radiation of the laser onto the organic molecular crystal and output means for utilizing the second harmonic frequency.

2. The second harmonic generator of claim 1 wherein the laser is a ruby laser.

3. The second harmonic generator of claim 1 wherein the organic molecular crystal is a condensed polynuclear hydrocarbon.

4. The second harmonic generator of claim 3 wherein the organic molecular crystal is 3,4-benzpyrene.

5. The second harmonic generator of claim 3 wherein the molecular crystal is 1,2-benzanthracene.

No references cited.

ROY LAKE, *Primary Examiner.*

D. A. HOSTETTER, *Assistant Examiner.*

U.S. Cl. X.R.

307—88.3